ALBERT F. ROMANOWSKI
LAURENCE A. WEINECKE
INVENTOR.

BY Edmund W. E. Kamm
ATTORNEY

United States Patent Office 2,770,130
Patented Nov. 13, 1956

2,770,130

MAGNETIC FLOW METER

Albert F. Romanowski, Fort Wayne, Ind., and Laurence A. Weinecke, Wilmette, Ill., assignors to Bowser, Inc., Fort Wayne, Ind., a corporation of Indiana Application October 3, 1950, Serial No. 188,180

7 Claims. (Cl. 73—194)

This invention relates to fluid flow meters of the type disclosed in the patent issued to Alexander Kolin, No. 2,149,847, and has for an object the elimination of some of the difficulties encountered in the operation of the Kolin device.

One of the objects of the invention is to provide relatively simple means for establishing a zero reading of the meter at no flow, hereinafter referred to as "zeroizing the meter."

Another object of the invention is to provide a meter which will remain zeroized and will not shift away from zero regardless of the change in the properties of the liquid being metered.

A further object of the invention is to produce a meter in which the signal is directly proportional to the rate of flow of the liquid.

Yet another object of the invention is to provide a meter which does not require adjustment to zeroize it when the conductivity of the liquid changes.

It is still another object of the invention to provide a meter in which the signal strength is substantially linear, that is, when the strength of the signal is plotted against the actual rate of flow, the result is a straight line.

Another object of the invention is to provide a meter of the kind described in which the signal strength is so much greater than the noise level that the latter is unimportant.

A further object of the invention is to provide a meter of the kind described in which limited variations in the field strength do not materially affect the readings.

These and other objects will become apparent from a study of this specification and the drawings which are attached hereto, made a part hereof and in which.

Figure 1:
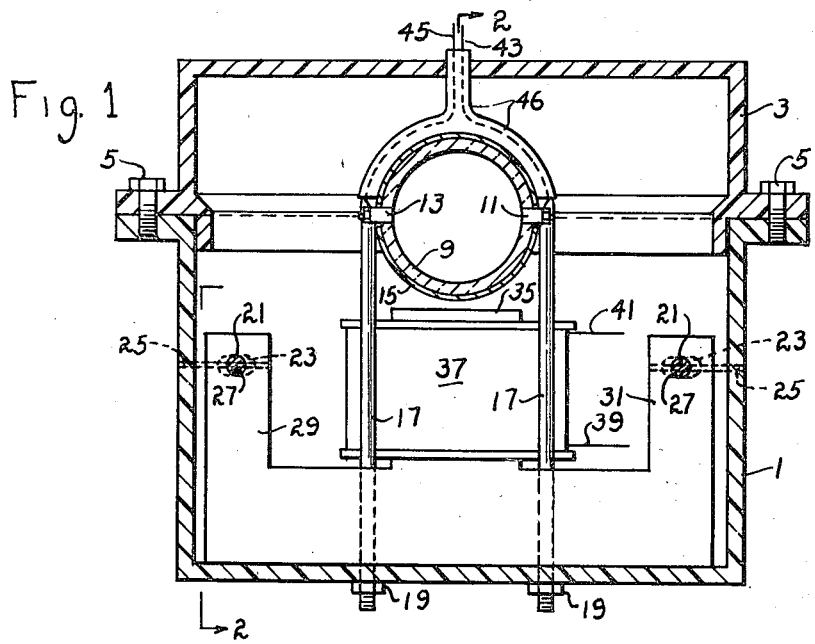
Figure 1 is a sectional elevation taken substantially on line 1—1 of Figure 2 showing the apparatus assembled.
Figure 2:
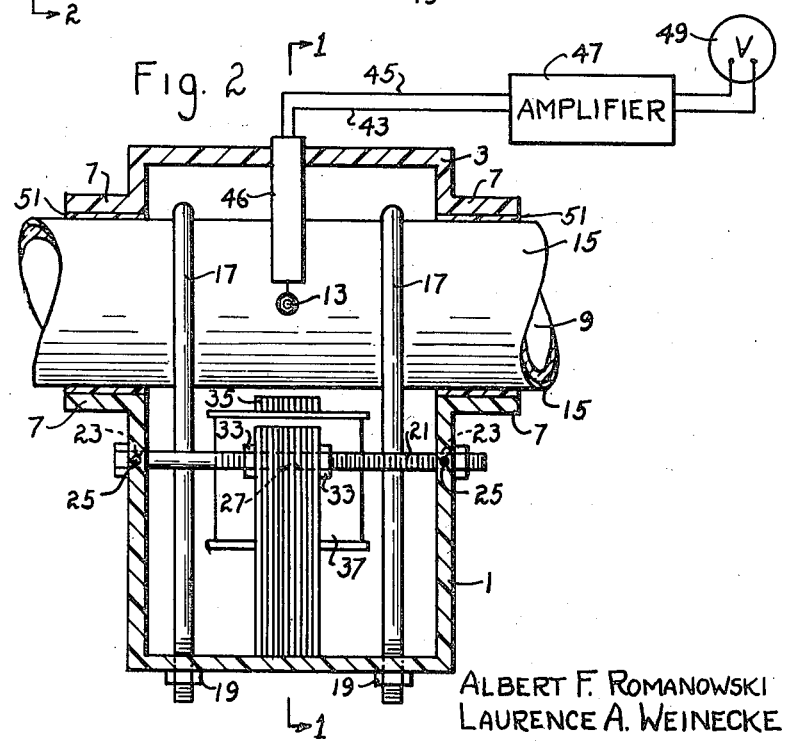
Figure 2 is an elevation taken substantially on the line 2—2 of Figure 1 showing the apparatus.

Referring to the figures, the numeral 1 represents the lower portion and 3 the cover of a case or housing for the apparatus which parts are held together by means of fasteners 5. The case has hollow bosses 7 which receive the conduit 9. The case may be of any suitable material. Although we have shown it as a non-metallic material, the use of a metal case is contemplated, especially where it is necessary to shield the instrument from electrical or magnetic effects existing in the vicinity of the instrument. A case of magnetic metal also has the effect of limiting the extent of the magnetic field and thereby limits the extent of the field along the leads. This insures that the current induced in the leads by alterations in field strength will be minimized and this insures that the instrument will remain zeroized even though the field strength changes.

As in the case of the Kolin device, the tube or conduit 9 is made of a non-magnetic material which is also a non-conductor of electricity. Materials such as glass, porcelain and certain plastics, either natural or synthetic may be used.

Output electrodes 11, 13 are sealedly inserted in the tube at horizontal, diametrically opposite sides thereof. The electrodes are, of course, current conducting.

The outer surface of the tube is provided with a jacket 15 of metal which is non-magnetic, such as copper, zinc, etc. The jacket may be applied as a pipe which is telescoped over the tube or by spraying or otherwise placing metal on the tube. The jacket is insulated from the electrodes and preferably extends the full length of the tube.

Suitable connections, not shown, are provided on the ends of the tube for mounting it in a conduit in which the liquid to be measured is flowing.

A pair of U-bolts 17 are seated on and project down from the pipe 9 and are passed through the case 1. Nuts 19 mounted on the U-bolts serve to hold the boss 7 of the case against the tube.

A pair of bolts 21 are mounted in horizontal slots 23 formed in the side walls of the case 1 so that the axes of the bolts lie substantially parallel with that of the tube, below and substantially equally spaced laterally from the vertical plane which contains the axis of the tube and at substantially the same radial distance from said axis. Pins 25 are inserted in the case 1 and each is substantially coincident with the major axis of the slot 23. The pins pass through the bolt to prevent endwise or rotational movement thereof, but allow lateral translation of the bolt along the associated pins.

A stack of E-shaped laminations are supported, with the legs 29, 31 and 35 extending upwardly, by the bolts 21 which pass through round holes 27 in the outer ends of the outer legs 29, 31 thereof. Nuts 33 are mounted on the bolts on opposite sides of the stack.

The laminations are symmetrical about the vertical axis of the central leg 35 which is substantially coincident with a vertical diameter of the tube, which diameter also lies in the vertical plane which includes the central axes of the electrodes.

While I prefer to use an E-shaped core, I may use any magnet, with or without a core, which has a single pole of one polarity disposed below the pipe and the other pole or poles of opposite polarity disposed symmetrically with respect to the first pole. I refer to such magnets hereafter as "symmetrical". The core merely increases the flux density in a known manner and hence the signal strength.

The width of the central legs of the laminations, as viewed in Figure 1, should be at least equal to the internal diameter of the tube and they should be spaced from the tube only very slightly. The planes of the laminations are normal to the pipe axis.

A coil 37 is wound on the central leg 35 and is supplied with current through the leads 39, 41.

A coil 37 is wound on the central leg 35 and is supplied with current through the leads 29, 41.

The pickup leads 43, 45 from the electrodes 11, 13 are taken upwardly, around the tube and are then taken vertically upwardly and out through the case, the intent being to dispose both leads symmetrically with respect to the central vertical plane which includes the axis of the tube, so long as they are in the region of the magnetic field. The leads are then carried to an amplifier 47 of any suitable kind and then to a voltmeter 49 or other suitable instrumentation to indicate the rate of flow of liquid through the tube or functions thereof. The leads 43 and 45 are preferably covered with a shield 46 of non-magnetic material such as lead.

Operation

Assuming that the meter (tube 9) is connected in the line and liquid is not flowing through the tube, it is necessary, when making the initial installation to zeroize the instrument. To do this the bolts 21 and nuts 33 are loosened and with the coil 37 and amplifier 47 energized, the magnet is shifted endwise of the bolts and the bolts may be shifted laterally in the slots until the reading on the voltmeter is zero. If required, the casing may be parted and the U-bolts 17 may be adjusted by adding or removing shim material 51, so that the magnet is seen to be adjustable in any of three perpendicular directions.

It has been found that a symmetrical magnet, such as that with an E-shaped core, produces a magnetic field which by adjustment can be arranged symmetrically about the vertical plane which includes the central, longitudinal axis of the tube and since the leads 43, 45 are also symmetrically disposed relative to the plane, where they extend into the field, there is substantially no current induced in the leads by the field. The signal induced in the liquid is carried by the leads substantially without the imposition of noise thereon.

It has also been found that stray fields or currents in the liquid in the region of the electrodes impose a noise on the electrodes so that the signal is not the pure signal induced by the flow of liquid past the electrodes in the field. It is also believed that the magnetic field within the tube may be distorted by the conductivity of the liquid. At any rate, it has been found that there is a shift of the zero position of the indicator when the conductivity of the liquid changes and where a plain tube such as proposed by Kolin is used.

Both the stray and the conductivity effects are overcome by shielding the tube with a non-magnetic electric conductor. The noise is reduced to a negligible amount.

Thus the signal obtained from the improved instrument, being substantially free from noise, is a pure signal of the same wave form as magnet-exciting current and one which is directly proportional to the current induced in the liquid and since this current is directly proportional to the velocity of liquid in the tube, the signal, amplified by a simple amplifier 47, can be read directly in terms of rate of flow on a properly calibrated voltmeter 49.

Under actual test, straight line proportionality has been consistently obtained between signal voltage and rate of flow of the liquid, from zero to flows of 30 G. P. M., with liquids ranging in resistance from 500 ohms to 30,000 ohms between the electrodes of the meter having a 1½" diameter tube. No shift of the zero position of the hand of the voltmeter was experienced.

It should be noted that the terms vertical, lateral, horizontal, etc. are used only to orient the parts relative to one another. Actually, the position of the meter in space does not affect its operation.

It should also be noted that the magnet herein described is preferably energized by alternating current and that the signal is also an alternating current. This eliminates troubles which arise from polarizing of the electrodes which occurs in the use of a direct current supply. The principles disclosed herein are as applicable to direct current operation as to alternating current operation.

It is obvious that various changes may be made in the form, structure and arrangement of parts without departing from the spirit of the invention. Accordingly, applicants do not desire to be limited to the specific embodiment disclosed herein primarily for purposes of illustration; but instead, we desire protection falling fairly within the scope of the appended claims.

What we claim to be new and desire to protect by Letters Patent of the United States is:

1. An apparatus for measuring fluid flow comprising a first non-magnetic, electrically non-conductive tube through which the fluid to be measured flows, a second non-magnetic, electrically conductive tube disposed exteriorly of said first tube, means disposed exteriorly of said tubes for creating a magnetic field across the entire cross-sectional area of said tubes, and output electrodes extending through the tubes within said magnetic field, said electrodes being insulated from the second tube and communicating electrically with the fluid within the first tube.

2. An apparatus for measuring fluid flow comprising a first non-magnetic, electrically non-conductive tube through which the fluid to be measured flows, a second non-magnetic, electrically conductive tube disposed exteriorly of said first tube substantially concentric therewith and closely adjacent thereto, means disposed exteriorly of said tubes for creating a magnetic field across the entire cross-sectional area of said tubes, and output electrodes extending through the tubes within said magnetic field, said electrodes being insulated from the second tube and communicating electrically with the fluid within the first tube.

3. An apparatus for measuring fluid flow comprising a tube through which the fluid to be measured flows, a case, means for suspending the case from said tube, magnet means disposed in said case for creating a magnetic field across the entire cross-sectional area of the tube, said magnet means comprising an E-shaped core disposed transversely of the tube with the pole face of its central leg adjacent the tube, means for supporting the core for translation both parallel to and transversely of the tube, output electrodes associated with said tube and communicating with said fluid, and leads connected with said electrodes, the electrodes, leads and the legs of the core being disposed substantially symmetrically about a plane containing the longitudinal axis of the tube.

4. An apparatus for measuring fluid flow comprising a tube through which the fluid to be measured flows, a case, means for suspending the case from said tube, magnet means disposed in said case for creating a magnetic field across the entire cross-sectional area of the tube, said magnet means comprising an E-shaped core disposed transversely of the tube with the pole face of its central leg adjacent the tube, means for supporting the core for translation both parallel to and transversely of the tube, comprising a bolt having its ends mounted in slots in the case, said slots extending transversely of the tube, said core being pierced to receive the bolt and nuts disposed on the bolt to hold the core in adjusted position thereon, output electrodes associated with said tube and communicating with said fluid, and leads connected with said electrodes, the electrodes, leads and the legs of the core being disposed substantially symmetrically about a plane containing the longitudinal axis of the tube.

5. An apparatus for measuring fluid flow comprising a tube through which the fluid to be measured flows, a case, means for suspending the case from said tube, magnet means disposed in said case for creating a magnetic field across the entire cross-sectional area of the tube, said magnet means comprising an E-shaped core disposed transversely of the tube with the pole face of its central leg adjacent the tube, means for supporting the core for translation both parallel to and transversely of the tube, comprising a bolt having its ends mounted in slots in the case, said slots extending transversely of the tube, pins mounted in the case, extending through the slots and bolt and parallel to the major axis of the slot, means for locking the bolt in adjusted position in the slots, said core being pierced to receive the bolt, and nuts disposed on the bolt to hold the core in adjusted position thereon, output electrodes associated with said tube and communicating with said fluid, and leads connected with said electrodes, the electrodes, leads and the legs of the core being disposed substantially symmetrically about a plane containing the longitudinal axis of the tube.

6. An apparatus for measuring fluid flow comprising a tube through which the fluid to be measured flows, a case of magnetic material, means for suspending the case from said tube, magnet means disposed in said case for creating a magnetic field across the entire cross-sectional area of the tube, said magnet means comprising an E-shaped core disposed transversely of the tube with the pole face of its central leg adjacent the tube, means for supporting the core for translation both parallel to and transversely of the tube, output electrodes associated with said tube and communicating with said fluid, and leads connected with said electrodes and extending through said case, the electrodes, that portion of the leads within the case and the legs of the core being disposed substantially symmetrically about a plane containing the longitudinal axis of the tube.

7. An apparatus for measuring fluid flow comprising a tube through which the fluid to be measured flows, a case, means for suspending the case from said tube, magnet means disposed in the case for creating a magnetic field across the entire cross-sectional area of the tube, said magnet means comprising a core disposed transversely of the tube, said core having a leg provided with a pole face disposed adjacent the tube, means for supporting the core for translation parallel to the tube, output electrodes associated with said tube and communicating with said fluid, and leads connected with said electrodes, the electrodes and core being disposed substantially symmetrically about a plane containing the longitudinal axis of the tube and said leads being disposed symmetrically with respect to said plane at least in the region in which the leads extend through a strong magnetic field produced by said magnet means.

References Cited in the file of this patent

UNITED STATES PATENTS

| | | |
|---|---|---|
| 2,149,847 | Kolin | Mar. 7, 1939 |
| 2,397,785 | Friedlander | Apr. 2, 1946 |
| 2,435,043 | Lehde et al. | Jan. 22, 1948 |
| 2,637,207 | De Boisblanc | May 5, 1953 |

OTHER REFERENCES

Radio Engineering, Terman: McGraw-Hill Book Co. 1937, pp. 44–47.

Electro-Magnetic Induction in Water by H. D. Einhorn; Transaction of the Royal Society of S. Africa, vol. 28, 1940–41, pp. 144–160.

Electromagnetic Velometry I, A. Kolin in Journal of Applied Physics, vol. 15, February 1944, pp. 150–164.

An Alternating Field Induction Flowmeter of High Sensitivity, Review of Scientific Instruments, vol. 16, No. 5, May 1945, A. Kolin.

Mercury Jet Magnetometer, Review of Scientific Instruments, vol. 16, No. 8, August 1945, pp. 209–213.